Oct. 24, 1972  D. O. DE PREE  3,700,592
PROCESS FOR THE REMOVAL AND RECOVERY OF MINERAL
POLLUTANTS FROM WATER
Filed Dec. 4, 1970  9 Sheets-Sheet 1

FIG. —1

INVENTOR
DAVID O. DePREE

FIG.-2 CHELEX-100 RESIN (IMIDODIACETIC ACID TYPE)(METHANOL SOLVENT, 10 ml FRACTIONS) 15 g RESIN

EFFECT OF MOISTURE ON THE REGENERATION OF SODIUM LOADED AMBERLITE CG-50 RESIN WITH ACETYLACETONE

FIG.-3

INVENTOR.
DAVID O. De PREE

Oct. 24, 1972  D. O. DE PREE  3,700,592
PROCESS FOR THE REMOVAL AND RECOVERY OF MINERAL
POLLUTANTS FROM WATER
Filed Dec. 4, 1970  9 Sheets-Sheet 6

EFFECT OF AMINE REGENERANT BASE STRENGTH ON CHLORIDE REMOVAL FROM AG3−X4 RESIN
− 0.1 N SOL. IN MeOH

FIG.−9

EFFECT OF REGENERANT BASE STRENGTH ON PHOSPHATE REMOVAL FROM AG3−X4 RESIN − 0.1 N SOL.
IN MeOH

FIG.−10

INVENTOR
DAVID O. DePREE

EFFECT OF SOLVENT ON REGENERATION OF AG3-X4 RESIN TRI-n-OCTYLAMINE, WATER SWOLLEN RESIN

FIG.—11

EFFECT OF AMINE STRUCTURE ON CHLORIDE REMOVAL — 0.1N SOLUTIONS IN METHANOL

FIG.—12

EFFECT OF AMINE STRUCTURE ON PHOSPHATE REMOVAL FROM AG3–X4 RESIN 0.1N SOLUTIONS IN METHANOL

FIG.–13

EFFECT OF TRIETHYLAMINE ON REMOVAL OF CHLORIDE OR PHOSPHATE IONS FROM AG3–X4 RESINS (0.1N TRIETHYLAMINE IN METHANOL)

FIG.–14

INVENTOR
DAVID O. DePREE

EFFECT OF TRIBENZYLAMINE ON REMOVAL OF CHLORIDE OR PHOSPHATE IONS FROM AG3-X4
RESINS (0.1N TRIBENZYLAMINE IN 70/30 METHANOL/TOLUENE)

FIG.—15

SEQUENTIAL REMOVAL OF CHLORIDE AND PHOSPHATE IONS FROM AG3-X4 RESIN WITH
TRIETHYLAMINE IN METHANOL

FIG.—16

INVENTOR
DAVID O. DePREE

United States Patent Office 3,700,592
Patented Oct. 24, 1972

3,700,592
PROCESS FOR THE REMOVAL AND RECOVERY OF MINERAL POLLUTANTS FROM WATER
David O. De Pree, Lommis, Calif., assignor to Aerojet-General Corporation, El Monte, Calif.
Filed Dec. 4, 1970, Ser. No. 95,286
Int. Cl. B01d 33/16, 15/06
U.S. Cl. 210—33                                     15 Claims

ABSTRACT OF THE DISCLOSURE

This patent describes a process for the treatment of an aqueous stream containing ionic pollutants to remove the ions from the stream and recover the ions which comprises: optionally countercurrently passing said aqueous stream through a bed of mixed ion exchange material to remove ionic pollutants from the stream and produce a substantially ion-free water, removing spent mixed ion exchange material from said bed and separating the same into anionic and cationic ion exchange material, removing the ionic pollutants from the separated spent anionic and cationic ion exchange material with anionic and cationic regenerant streams to regenerate the anionic and cationic ion exchange material and to form spent anionic and cationic regenerant streams, returning the regenerated anionic and cationic exchange material to said bed, treating said spent cationic regenerant stream with a metal precipitant to form precipitated metal carbonates and recover the cationic regenerant stream for recycle to said spent cationic ion exchange material, and contacting said spent anionic regenerant stream with said precipitated metal carbonates at elevated temperatures to precipitate metal salts and recover metal precipitant for recycle to said spent cationic regenerant stream and anionic complexing agents for recycle to said spent anionic ion exchange material.

BACKGROUND OF THE INVENTION

In recent years, it has been found that ionic pollution in the form of waste and by-product from industrial plants, refineries, and the like has a drastic effect on the ecological balance if discharged into lakes, rivers, and streams. Ionic pollution has been found to destroy fish and other marine life. Pollution is an actual or potential hazard to swimmers and fishermen. Pollution also has many side effects including the upsetting of the biological balance in a body of water, resulting in so-called "dead" lakes. Further, pollution aggravates the problem of producing potable water for many cities and municipalities throughout the nation. The present invention is concerned with the acceptable disposal of mineral pollutants from industrial and other waste streams prior to discharge into lakes, rivers and streams.

All current economically sound processes for reducing mineral pollution include as one product a waste stream of highly polluted water, for which the problem of satisfactory disposal remained to be solved. The present invention solves this serious and urgent problem. More specifically, according to my invention, mineral pollutants are recovered as precipitated products, thereby eliminating the cost of transport of waste water and the necessity of additional processing steps such as evaporation before final disposal can be achieved. The process of this invention also provides for the selective recovery of ions of commercial value as a source of income to offset disposal costs of non-valuable pollutants. The process of this invention minimizes expenditures for chemicals by providing means for recycle of all reagents required in the disposal process and by otherwise limiting reagent losses. The process is, with minimum modifications, adaptable to a variety of feed stream compositions. Desalination waste streams from any of the state-of-the-art methods for producing potable or irrigation water from brackish waters are among the compatible feed streams. Finally, it is believed that the process of this invention can be conducted at a reasonable cost, taking into account the severity of the particular pollution problem and on the estimated value of purifying any particular stream.

SUMMARY OF THE INVENTION

Briefly, the present invention comprehends a process for the treatment of an aqueous stream containing ionic pollutants to remove the ions from the stream and recover the ions which comprises: optionally countercurrently passing said aqueous stream through a bed of mixed ion exchange material to remove ionic pollutants from the stream and produce a substantially ion-free water, removing spent mixed ion exchange material from said bed and separating the same into anionic and cationic ion exchange material, removing the ionic pollutants from the separated spent anionic and cationic ion exchange material with anionic and cationic regenerant streams to regenerate the anionic and cationic ion exchange material and to form spent anionic and cationic regenerant streams, returning the regenerated anionic and cationic exchange material to said bed, treating said spent cationic regenerant stream with a metal precipitant to form precipitated metal carbonates and recover the cationic regenerant stream for recycle to said spent cationic ion exchange material, and contacting said spent anionic regenerant stream with said precipitated metal carbonates at elevated temperatures to precipitate metal salts and recover metal precipitant for recycle to said spent cationic regenerant stream and anionic complexing agents for recycle to said spent anionic ion exchange material.

It is an object of the present invention to provide for a novel process of treating aqueous streams containing ionic pollution.

More particularly, it is an object of my invention to treat such streams to precipitate the ions and eliminate them as a source of pollution.

It is also an object of this invention to permit the economic recovery of certain ions for commercial use from said streams.

Yet another object of this invention is the treatment of aqueous streams containing ionic pollution utilizing novel recycle techniques which are surprisingly simple and yet effective.

These and other objects and advantages of this invention will be apparent from the more detailed description which follows taken in conjunction with the accompanying drawings.

DESCRIPTION OF THE PREFERRED EMBODIMENTS

Turning to the drawings.

Figure 1:
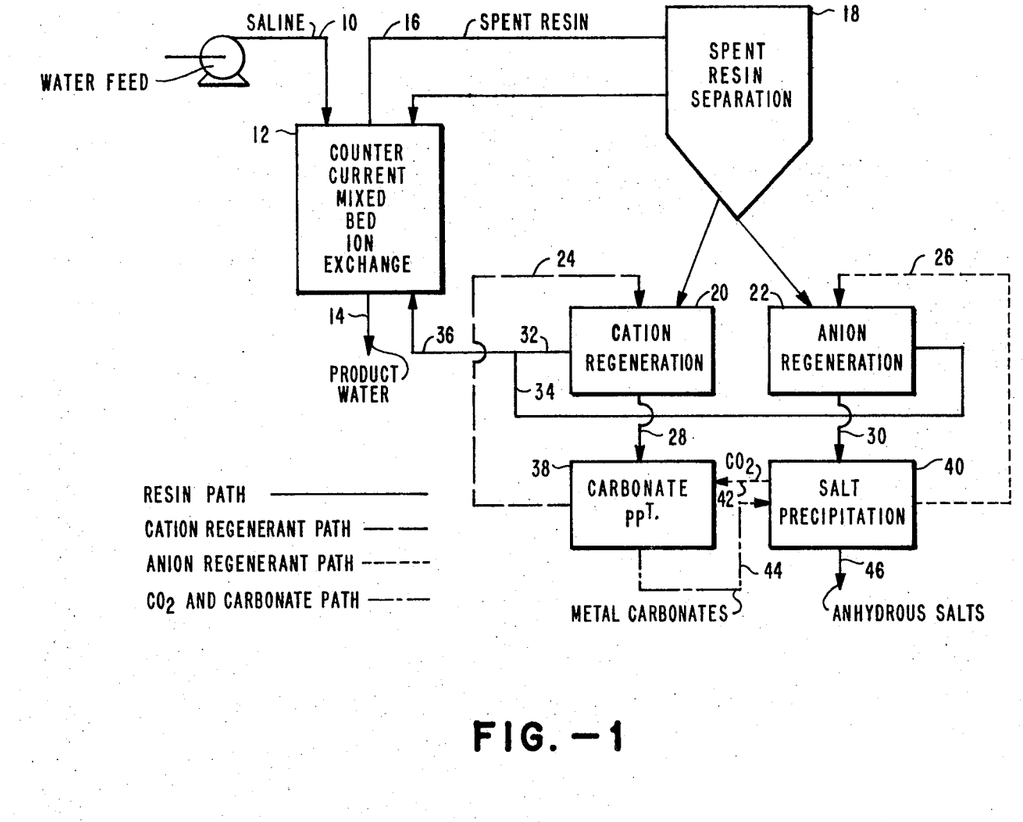
FIG. 1 represents a schematic drawing of the process.

The water containing ionic pollution is introduced by line 10 to the mixed bed ion exchange 12. The deionized water is discharged through line 14. The spent mixed ion exchange material is passed via line 16 to a separator 18 where the material is segregated into cation ion exchange material and anionic ion exchange material. The former is then passed to cation ion exchange material regeneration zone 20 and the latter to anionic ion exchange material regeneration zone 22. Cation regenerant is introduced to zone 20 via line 24 and anion regenerant is introduced to zone 22 via line 26. The spent cation regenerant is discharged from zone 20 via line 28 and the spent anion regenerant is discharged from zone 22 via line 30. The regenerated cation ion exchange material is passed through line 32 and joins with the regenerated anion ion exchange material from line 34 in line 36 for recycle to the mixed bed ion exchange 12. The spent cation regenerant is liberated from the pollutant cations in zone 38 and the spent anion regenerant is effectively freed of the pollutant anions in zone 40. The zone 38 is supplied with metal ion precipitant generated as a by-product in zone 40 via line 42. The metal carbonates formed in zone 38 are cycled to zone 40 via line 44 where they are treated to yield metal salt products removed at line 46.

As can be seen, the mineral pollutants are recovered as anhydrous precipitates for easy disposal rather than as a concentrated aqueous stream which must be further treated. All chemicals used in the regeneration of both the ion exchange resins and in the salt recovery are recovered and recycled, resulting in maximum economy rather than consumption as in conventional processes. The process can be further modified to provide for the selective isolation of specific anions and cations and their recombination to recover specific salts preferentially through the use of specially selected chelating agents and amines in the regeneration steps.

It is the unique combination of steps resulting in a highly effective overall result which is the essence of this invention. The removal of mineral salts by adsorption on ion-exchange resins, per se is known, and can be accomplished by a variety of established processes, such as the Degremont-Cottrell process. The separation of the spent cationic and anionic exchange resins is also known. The regeneration of the spent ion anion exchange material and the recovery of mineral salts and chemical reagents from the regenerant streams are the features critical to the achievement of the overall result.

The successful regeneration of spent cationic and anionic exchange resins, both non-selectively and selectively, has been demonstrated for resins loaded with typical mineral pollutants: sodium, potassium, calcium, magnesium, chloride and phosphate. The regeneration of the anionic and cationic exchange resins is accomplished separately, and these two steps are discussed separately below.

The present invention is generally applicable to cation exchange materials, preferably weakly acidic cation materials such as B10–REX 63 (moderately acidic, phosphonic acid, polystyrene type), Amberlite CG–50 (weakly acidic, carboxylic acid, polymethacrylic type) and Chelex–100 (a very weakly acidic, iminodiacetic acid, polystyrene type). These materials are regenerated with chelating agents. The regeneration of the cation exchange resins with chelating agents can be carried out in accordance with the procedure described in pending U.S. patent application Ser. No. 38,244, filed May 18, 1970 now U.S. Pat. 3,663,163 issued May 16, 1972 in the names of David O. De Pree and Herman H. Weyland, the disclosure of which is expressly incorporated herein by reference. The types and species of chelating agents, which may be employed are designated in the above-identified United States patent application.

The anion exchange materials used in this invention are preferably weakly basic and include the high capacity polyamine resins.

These materials are regenerated with solutions of organic bases in organic solvents. The types of organic bases which may be employed include ammonia; aliphatic primary, secondary and tertiary amines; primary, secondary and tertiary amino alcohols; aromatic substituted aliphatic amines such as mono, di and tribenzyl amine; heterocyclic organic bases such as pyridine, piperidine and the like; guanidine compounds or any other organic soluble bases which form acid salts and inorganic acids. The stronger bases such as the aliphatic amines are preferred over the aromatic amine because of their greater efficiency. Low molecular weight aliphatic amino alcohols such as 2-amino ethanol are preferred over low molecular weight amines in that they provide an equally high capacity for salt formation but are higher boiling and hence are less prone to loss through evaporation thus reducing the overall operating cost of the process.

Solvents for the regeneration step include non-aqueous solvents for the bases and their acid salts which are non-solvents for the mineral salts precipitated by neutralization with metal oxides or carbonates. Such solvents include primary and secondary alcohols, such as methanol, ethanol; polyols such as glycol and glycerine, aliphatic and aromatic ethers and polyethers such as diethyl ether, diphenyl ether or dimethoxy ethane, hydrocarbons such as paraffins (hexane, octane, nonane) or aromatics (benzene, toluene, xylene). The latter systems are solvents for long chain organic bases and their salts such as dodecyl amine.

The elevated temperature required for the reaction of the metal carbonates with the spent amine regenerant stream to liberate $CO_2$ and amine regenerant for recycle and precipitation of the metal salts is from about 60 to 170° C. and can be readily determined for any particular amine, carbonate and/or or solvent.

The following examples are presented solely to illustrate the invention, and should not be regarded as limiting in any way.

EXAMPLE I

Figure 2:
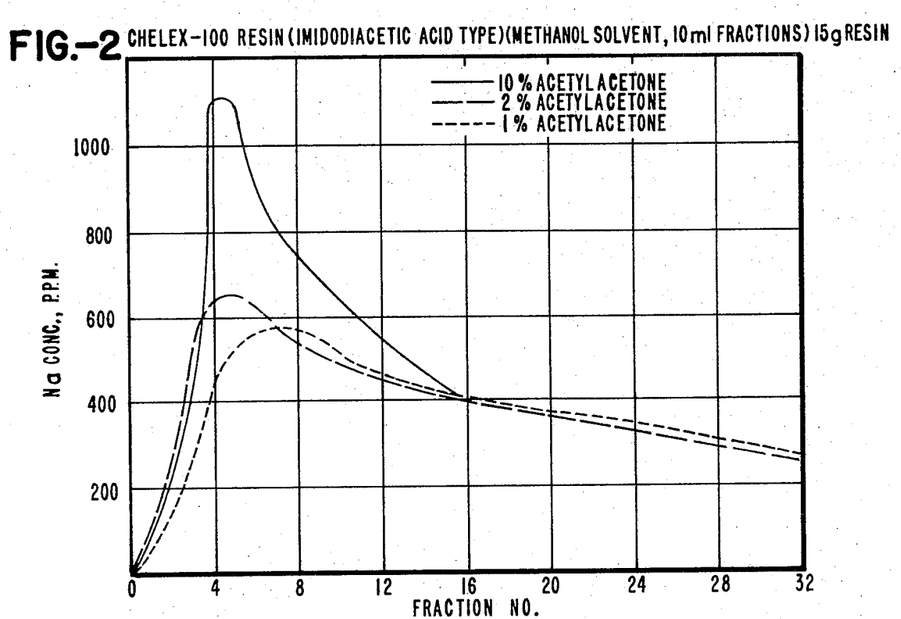
FIG. 2 shows the effect of acetylacetone concentration in methanol of the rate of elution of sodium ion from a polymethacrylic acid ion exchange resin.

The regeneration of Amberlite CG–50 [Amberlite CG–50 resin is polymethacrylic acid. It is manufactured by Rohm & Haas Co., Philadelphia. The particular grade used in the examples was supplied by Mallinckrodt Chemical Works and was analytical reagent grade, 100–200 mesh particle size with a total exchange capacity of 10.0 meq./g.], loaded with sodium, potassium, magnesium and calcium ions in the ratio in which they occur in sea water, was conducted with solutions of selected chelating agents in methanol solution. Extraction with 2-acetylcyclohexanone produced a mixture of potassium and sodium chelates in which the potassium content had been enriched approximately seven fold over the ratio existing in the resin. Sodium ion free of potassium, magnesium and calcium was then removed from the resin with a methanol solution of acetylacetone. Separation of magnesium and calcium was achieved with a methanol solution of citric acid. The effect of acetylacetone concentration on the rate of sodium elution is shown in FIG. 2. The relatively small effect of chelate concentration on rate of regeneration was confirmed in a repeat experiment with anhydrous resin and concentrations of 0.1, 0.05, 0.02 and 0.01 N acetylacetone in methanol solution. Regeneration of the Chelex-100, Amberlite CG-50 and B10-REX 63 resins also occurred readily with acetylacetone in methanol solution.

TABLE 1.—REGENERATION OF CATION EXCHANGE COLUMNS USING 0.1 N ACETYLACETONE IN VARIOUS SOLVENTS

[Water swollen resin]

| Cation | Solvent | P.p.m. removed |
|---|---|---|
| Na | Methanol | 1,080 |
| Na | Dimethoxy ethane | 60 |

EXAMPLE II

The following table illustrates the effectiveness of 0.1 N methanol solution β-diketones in the regeneration of sodium loaded Amberlite CG-50 resin.

TABLE 2

| Chelating agent | Conc., normal | Average Na⁺ conc. in eluent, p.p.m. |
|---|---|---|
| Acetylacetone | 0.1 | 6 |
| 2,4,4-trimethyl substituted acetylacetone | 0.1 | 90 |

Figure 3:
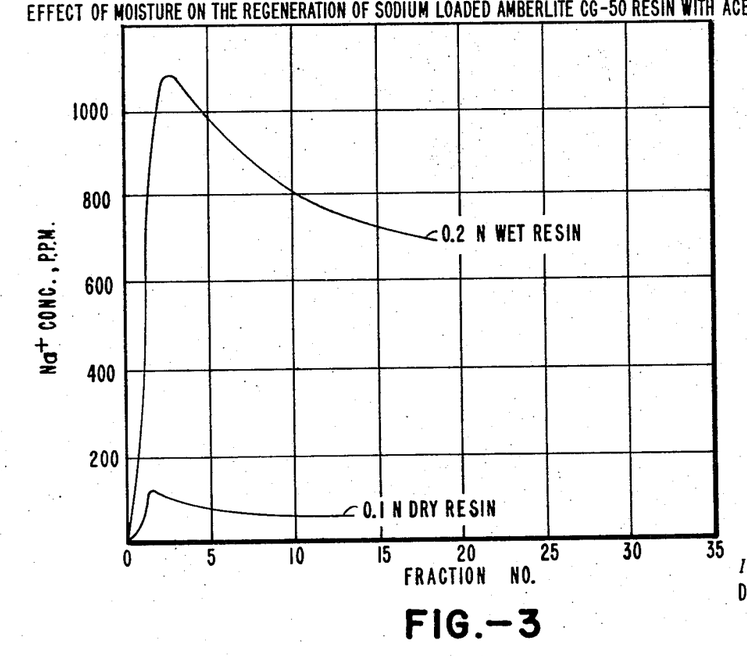
FIG. 3 depicts the effect of resin hydration on the efficiency or removal of sodium ion from polymethacrylic acid resin with a methanol solution of acetylacetone.

In general, it is preferred that the spent cation exchange material be saturated with water prior to regeneration. A comparison of the removal of sodium ion with acetylacetone in methanol from Amberlite CG-50 resin (polymethylacrylic acid resin) prepared by the two procedures shows that sodium is removed from the resin containing residual water at an order of magnitude higher than the rate from the thoroughly dried resin, FIG. 3. The extent of the effect of water on the regeneration process is shown by varying the percentage of water present on the resin and in some instances adding water to the methanol solvent.

TABLE 3.—EFFECT OF WATER ON THE REGENERATION OF SODIUM LOADED CG-50 RESIN USING 0.1 N ACETLYACETONE

| Cation | Solvent | Percent water on resin | P.p.m. removed |
|---|---|---|---|
| Na | MeOH | 50 | 1,080 |
| Na | MeOH | 20 | 1,020 |
| Na | MeOH/20% H₂O | 20 | 745 |
| Na | MeOH | (¹) | 1,000 |
| Na | MeOH/20% H₂O | (¹) | 950 |
| Na | MeOH | 0 | 100 |

¹ Water saturated.

It can be seen from Table 3 that a ten-fold increase in regeneration rate is realized when a water swollen resin is used. The amount of water present, 20% saturated or 50% saturated does not affect the regeneration rate. This is a desirable factor since the cation regeneration normally follows a water wash in the process cycle.

EXAMPLE III

Figure 4:
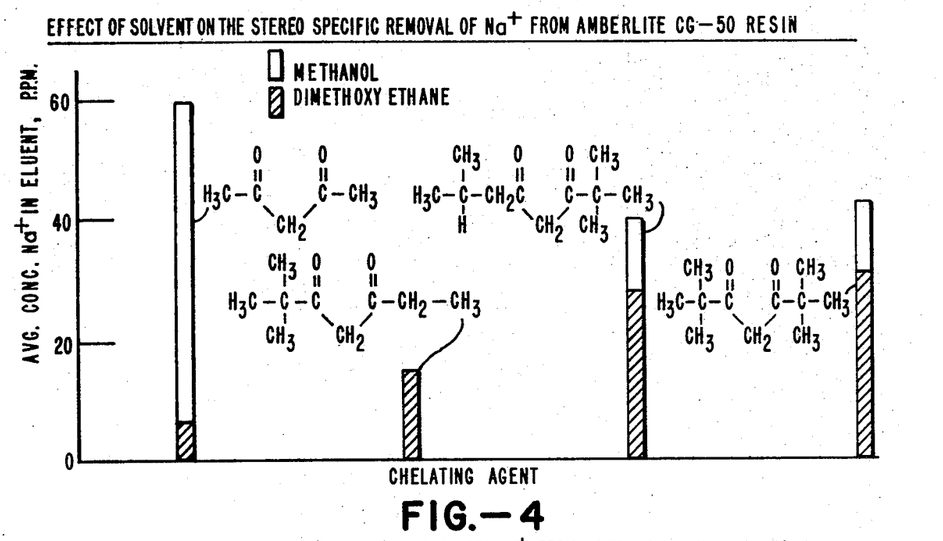
FIGS. 4 and 5 described the effect of various solvents on the stereospecific removal of sodium ion from a polymethacrylic acid resin.
Figure 5:
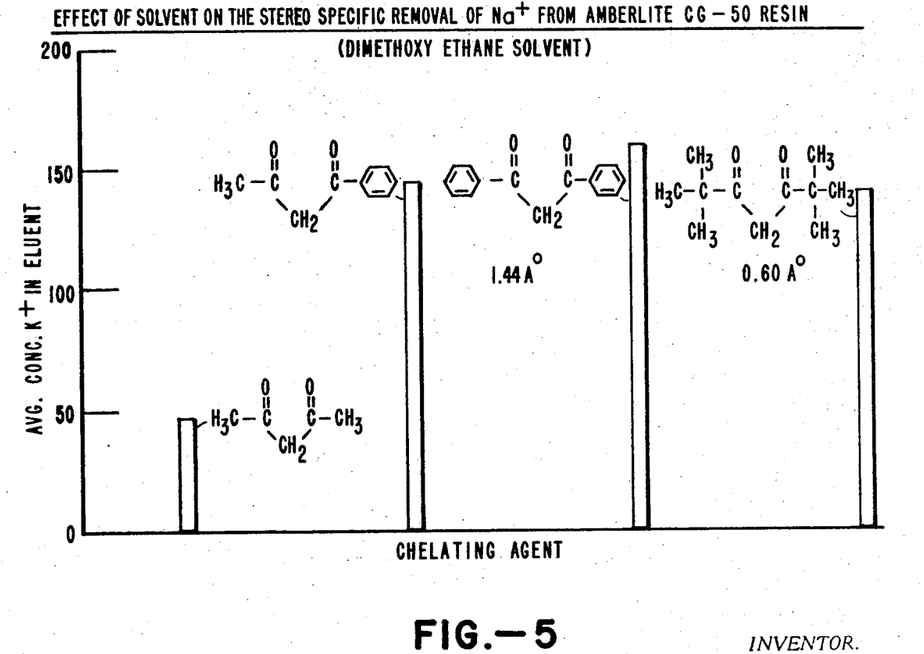

The effect of various chelates on the rate of elution of sodium and potassium from dry Amberlite CG-50 resin is shown in the bar chart, FIGS. 4 and 5. While not bound by any theory, it is believed that these data demonstrate the effect of steric fit of the chelate on the rate of regeneration and also indicate the influence of solvent coordination on the selectivity provided. For example, the highest rate of removal of potassium is with dibenzoyl methane which has an oxygen-oxygen separation distance of 1.44 A.[7] which best fits the potassium ion which has a radius of 1.33 A.[8] Quite surprisingly the rate of ion removal falls off not only with oxygen-oxygen separation distance below the ideal but also with chelating agents providing larger than ideal spacing. This makes it possible to follow any order of ion removal rather than a sequential treatment to remove ions in order of increasing ionic radius. This also means that the more valuable cations such as potassium which occur in low concentration can be selectively removed prior to the removal of the more abundant though smaller sodium ion. On this basis the loss of valuable ions can be minimized and the degree of selectivity required for practical upgrading of these ions does not have to be as high as would be required in a separation order based on progressively increasing ion radii. The most effective chelating agents for use in methanol solvent both from a standpoint of specific selectivity for potassium over sodium and for total rate of removal based on the data obtained with water swollen Amberlite CG-50 resin are 2-acetylcyclohexanone and 1,1,1-trifluoro-5,5-dimethylhexane - 2,4 - dione. Each of these materials appears to remove approximately 10 times as much potassium ion as sodium.

EXAMPLE IV

This example shows the separation of monovalent cations from bivalent cations in the resin regeneration process. Only monovalent cations were removed from Amberlite CG-50 by most conventional β-diketones. No measurable quantity of calcium ion for example was removed by dibenzoyl methane, even though the oxygen-oxygen spacing for dibenzoyl methane is 1.44 A.[7] which would be expected to remove at least some of the calcium ion (ionic radius 0.94 A.[8]). Similarly magnesium ion with an ionic radius of 0.65 A.[8] was not removed by dipivaloyl methane (oxygen-oxygen separation distance 0.60 A.[8]) even though the steric fit should be excellent. Thus, monovalent ions can be separated from polyvalent cations because of the specificity of most β-diketones for the monovalent ions.

EXAMPLE V

In the following example regeneration was carried out using 2-acetylcyclohexanone, dibenzoyl methane or 1,1,1-trifluoro-5,5-dimethylhexane-2,4-dione solutions in methanol demonstrated enrichment of the potassium over sodium in approximately the ratio anticipated from the single cation resin experiments. The ratio of cations found in sea water (potassium/sodium ~1/20 wt. ratio) was used in preparing the mixed cation Amberlite CG-50 resin. All three chelates provided an 8 to 10 fold enrichment of potassium in the eluent. The substitution of a thienyl group in place of the t-butyl group in 1,1,1-trifluoro-5,5-dimethylhexane-2,4-dione results in a significant increase in the rate of elution of both sodium and potassium while still providing for a significant enrichment (~10 fold) of the potassium content in the eluent: Substitution of a phenyl group (1,1,1-trifluoro-4-phenylbutane-2,4-dione) provides not only a significant increase in rate of elution but a 20 fold enrichment of the potassium.

Figure 6:
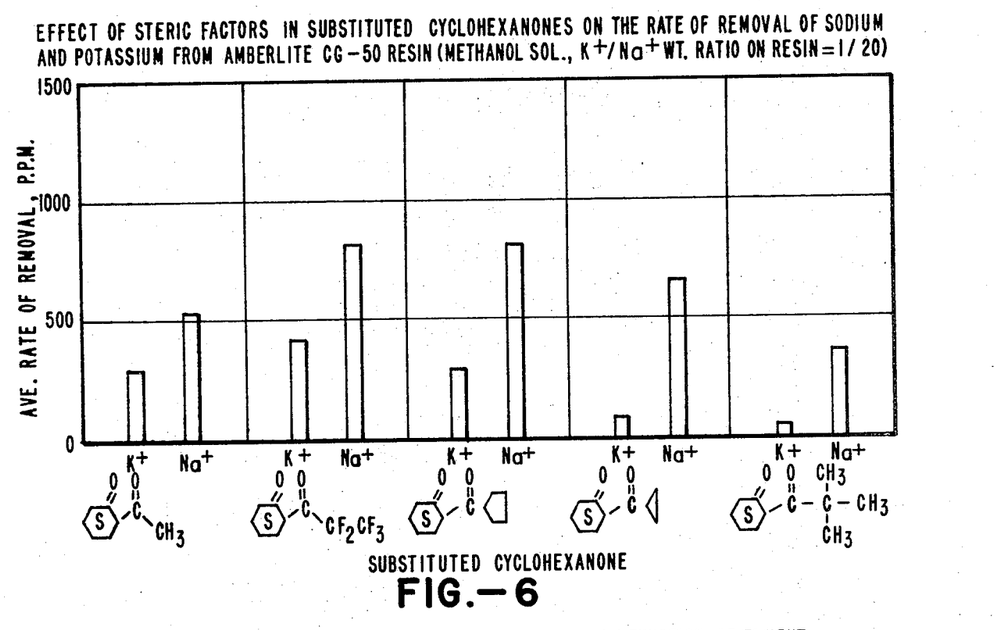
FIG. 6 depicts the effect of changes in steric hindrance of the ligand on both the rate and selectivity of elution of sodium and potassium from polymethacrylic acid resins.

The effect of changes in steric hindrance on both rate of elution and selectivity is shown by substitution of other carbonyl substituted structures for the acetyl structure in 2-acetylcyclohexanone. The bar graph, FIG. 6, indicates that increase of steric hindrance and the resultant reduction of the oxygen-oxygen separation distance results in a less specific separation of potassium and a more favorable extraction of sodium. Substitution of fluorine increases the rate of extraction without significantly affecting the selectivity.

EXAMPLE VI

To simulate the stepwise regeneration of a typical spent resin from desalination of sea water, three grams of Amberlite CG-50 resin loaded with potassium, sodium, magnesium and calcium in the same ratio as that occurring in sea water, was sequentially treated with 0.1 N solutions of selected chelating agents in methanol and the extracts analyzed for the 4 metal ions. The data obtained from this experiment indicated a high degree of separation of the metal ions. The metal ion content of the resin was as follows:

| Metal ion: | Content, meq. |
|---|---|
| $K^+$ | 0.402 |
| $Na^+$ | 19.61 |
| $Mg^{++}$ | 2.26 |
| $Ca^{++}$ | 0.391 |

Figure 7:
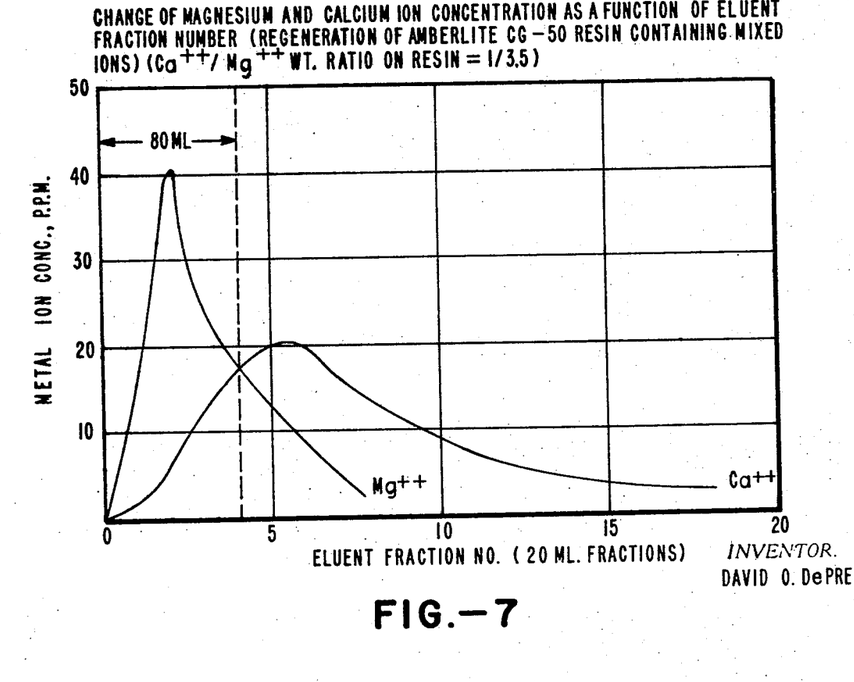
FIG. 7 describes the sequential elution of magnesium and calcium from a polymethacrylic resin with a complexing agent.

The chelating agents selected for the separation of potassium and sodium were 2-acetylcyclohexanone and acetylacetone respectively. No selective chelating agents had been found for calcium and magnesium. It was observed, however, that for mixtures of calcium and magnesium loaded resins that the magnesium is removed more rapidly in the early eluent and that the calcium concentration in the eluent builds up in the later fractions. The change of magnesium and calcium ion concentration as a function of eluent fraction number is shown in FIG. 7. These data demonstrate that by judicious selection of a cut off point, in this instance 80 ml., an effective separation of the two ions is achieved. The solutions employed in the combined experiment, in the order of elution and the metal ion recovery is shown below:

| Extraction No. | Chelating agent | Total volume extract, ml. | Total metal ion recovered, meq. | | | |
|---|---|---|---|---|---|---|
| | | | $K^+$ | $Na^+$ | $Mg^{++}$ | $Ca^{++}$ |
| 1 | 2-acetylcyclo-hexanone | 1,000 | 0.31 | 2.3 | 0.0 | 0.0 |
| 2 | Acetylacetone | 2,500 | 0.0 | 13.0 | 0.0 | 0.0 |
| 3 | Citric acid | 80 | 0.0 | 0.0 | 3.0 | 0.1 |
| 4 | do | 920 | 0.0 | 0.0 | 0.0 | 0.37 |

The effectiveness of the agents in separating the ions is clearly shown by the above data.

EXAMPLE VII

Figure 8:
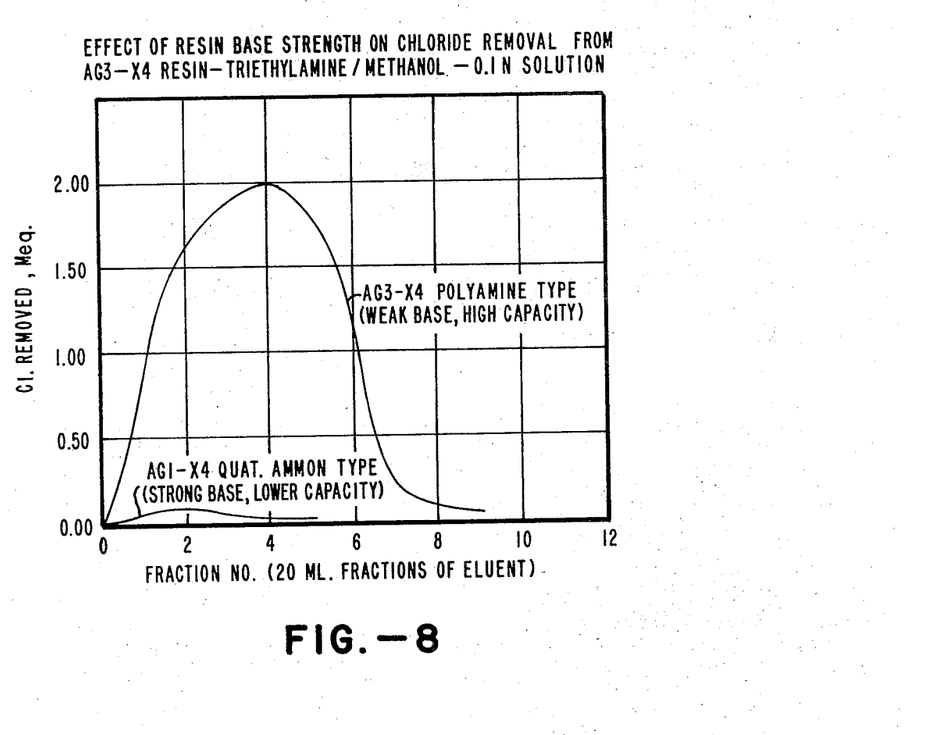
FIG. 8 describes the effect of resin basicity on the removal of chloride ion with an aliphatic amine regenerant in methanol solution.

This example compares the regeneration of a chloride loaded polyamine anion exchange resin (AG3–X4, Bio Rad. Laboratories) with a chloride loaded quaternary ammonium type anion exchange resin (AG1–X4, Bio Rad. Laboratories) using a 0.1 N methanol solution of triethylamine presented in FIG. 8, shows the former to be regenerated at more than 30 times the rate of the latter. As in the case of the regeneration of cation exchange resins, the anion exchange resin should be water swollen in order to achieve most efficient regeneration.

EXAMPLE VIII

Figure 9:
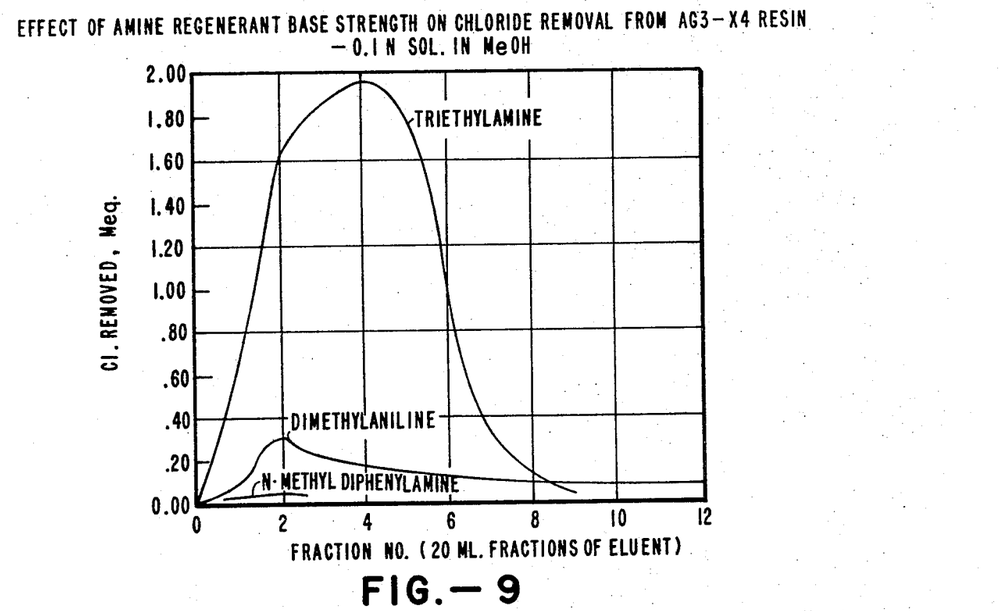
FIGS. 9 and 10 represent the effect of the basicity of the regenerant solution on the removal of anions from polyamine resins.
Figure 10:
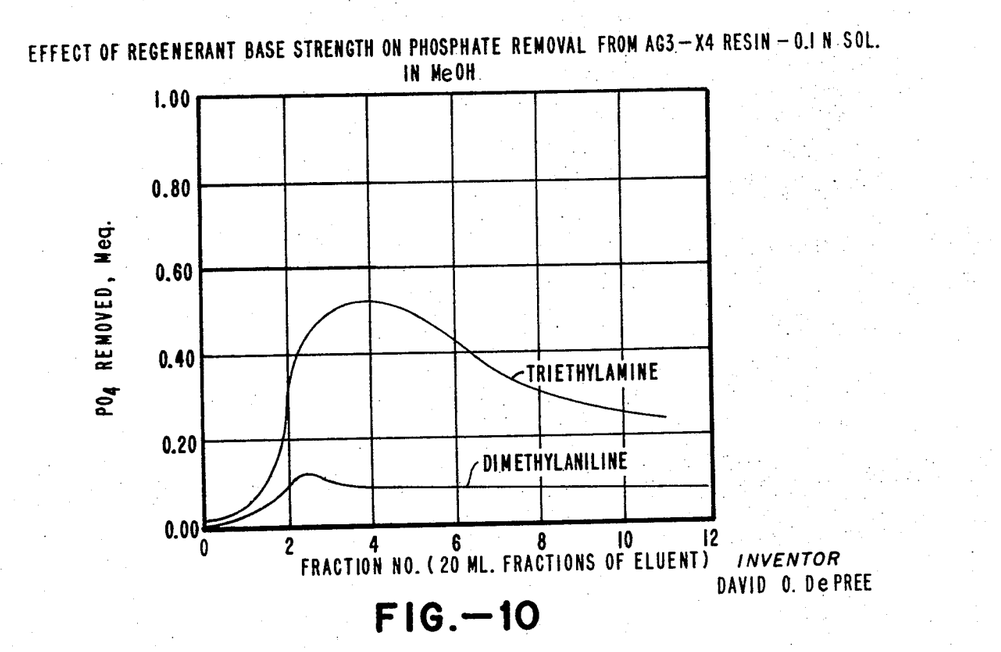

The effect of basicity of the regenerating solution on the rate of regeneration of anion loaded polyamine type resins is shown in FIGS. 9 and 10. The data indicates that solutions of aliphatic amines are efficient regenerants for anion exchange resins. Reduction in base strength resulting from substitution of aromatic groups on the amine nitrogen results in a reduction in rate of regeneration. For example, triethylamine (0.1 N in methanol) readily removes chloride and phosphate ions from polyamine type anion exchange resins, FIGS. 9 and 10. Dimethylaniline removes chloride at only one tenth the rate and phosphate at one fifth the rate achieved with triethylamine. Substitution of a second aromatic group (N-methyldiphenylamine) results in essentially no anion removal.

EXAMPLE IX

Figure 11:
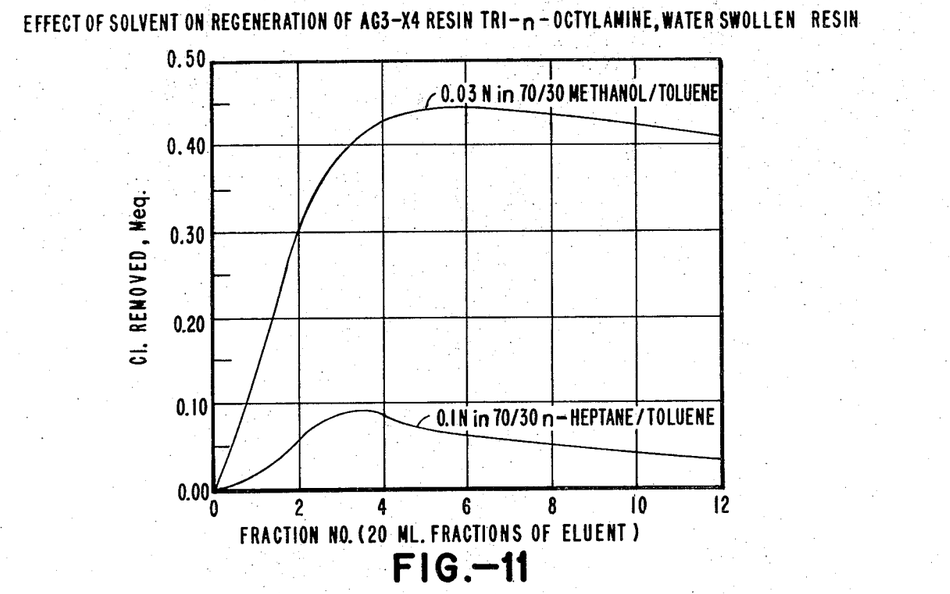
FIG. 11 describes the effect of solvent composition on the removal of chloride ion from polyamine resins using an amine regenerant.

The following example shows that methanol is more efficient in promoting anion exchange resin regeneration than other solvents. An indication of the effect of solvent on the rate of regeneration of chloride loaded polyamine anion exchange resins is shown by the data presented in FIG. 11. In this example where tri-n-octylamine was used as the organic base and 30% toluene was required to dissolve the amine, the use of methanol in place of n-heptane as the remaining 70% of the solvent mixture results in a five-fold increase in the rate of chloride removal.

The above example also illustrates the use of mixed solvents in which the preferred methanol solvent may be diluted with a hydrocarbon solvent to achieve a rate of removal of anion comparable to that demonstrated with other amines with methanol alone. Thus it is possible to use mixed solvents to reduce solvent cost or to reduce evaporative losses during the regeneration and precipitation steps of the process.

EXAMPLE X

Figure 12:
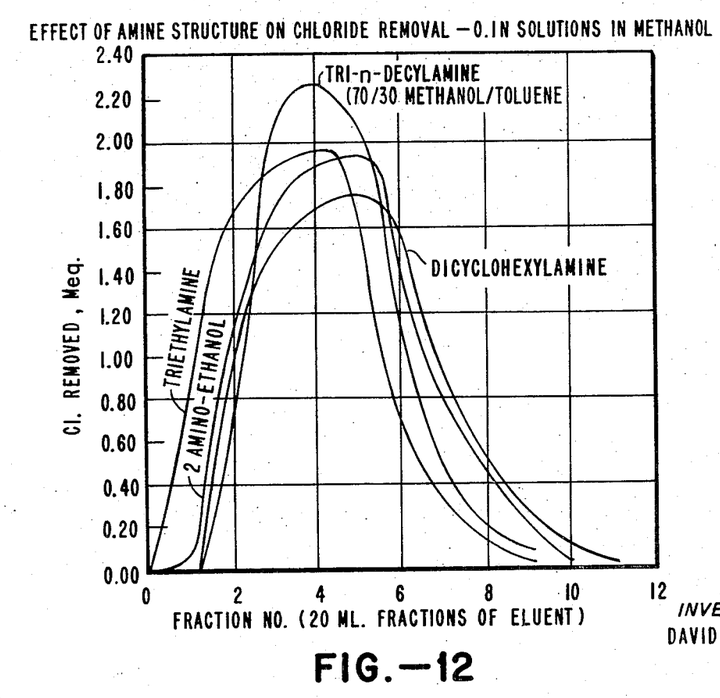
FIG. 12 shows the effectiveness of a variety of amines in regenerating a chloride loaded polyamine resin.
Figure 13:
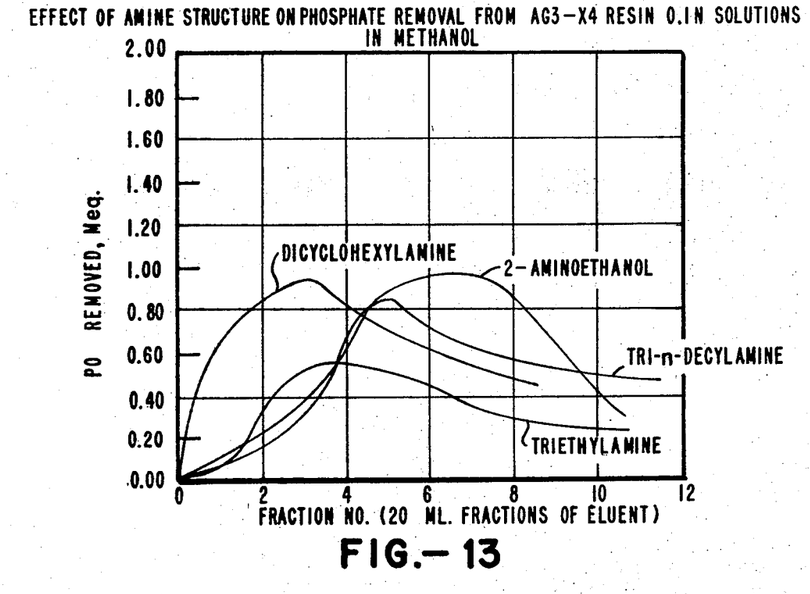
FIG. 13 describes the effectiveness of a variety of amines in regenerating a phosphate loaded polyamine resin.
Figure 14:
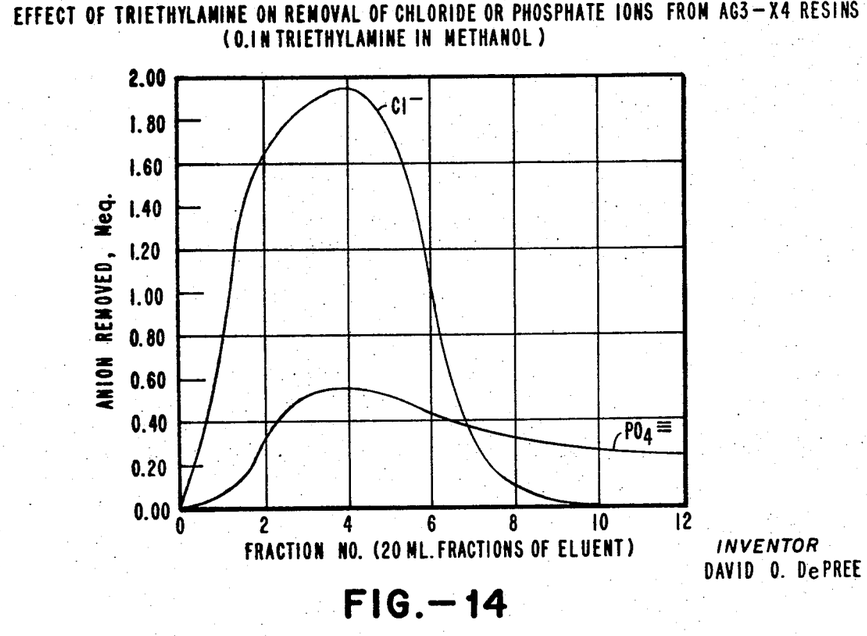
FIG. 14 shows that in methanol solution triethylamine removes chloride ion preferentially over phosphate ion from polyamine resins.
Figure 15:
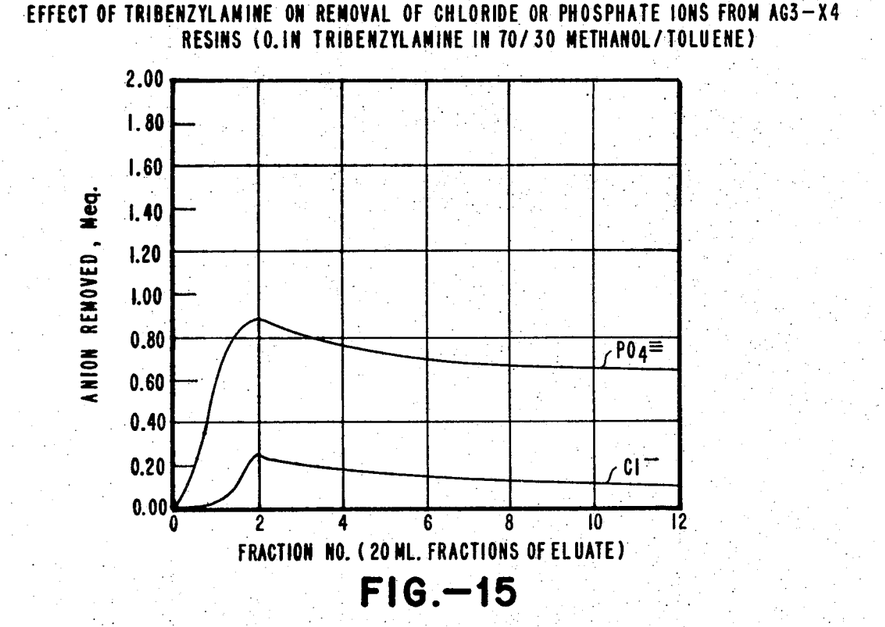
FIG. 15 describes the more effective removal of phosphate ion over chloride ion when tribenzylamine in methanol is used as the regenerant.

The effectiveness of a variety of amines in methanol solution in regenerating a chloride loaded polyamine anion exchange resin (AG3–X4) is shown in FIG. 12. All four alkylamines shown are about equally effective and readily remove the chloride ion. The effectiveness of these four amines in regenerating the same resin loaded with ortho-phosphate ion is shown in FIG. 13. While the rate of removal is considerably lower than for the chloride ion, the higher molecular weight amines and 2-amine ethanol remove phosphate ion at equivalent rates. Triethylamine is considerably less effective in regenerating a phosphate loaded resin. Comparison of the effectiveness of triethylamine in removing the anions from the resin in the two experiments is graphically presented in FIG. 14. Phosphate ion may be removed preferentially over chloride when polyamine resins are eluted with a 70/30 methanol/toluene solution of tribenzylamine (toluene required for solubility of the amine). A comparison of its effectiveness in removing the two anions in separate extractions is shown in FIG. 15.

EXAMPLE XI

Figure 16:
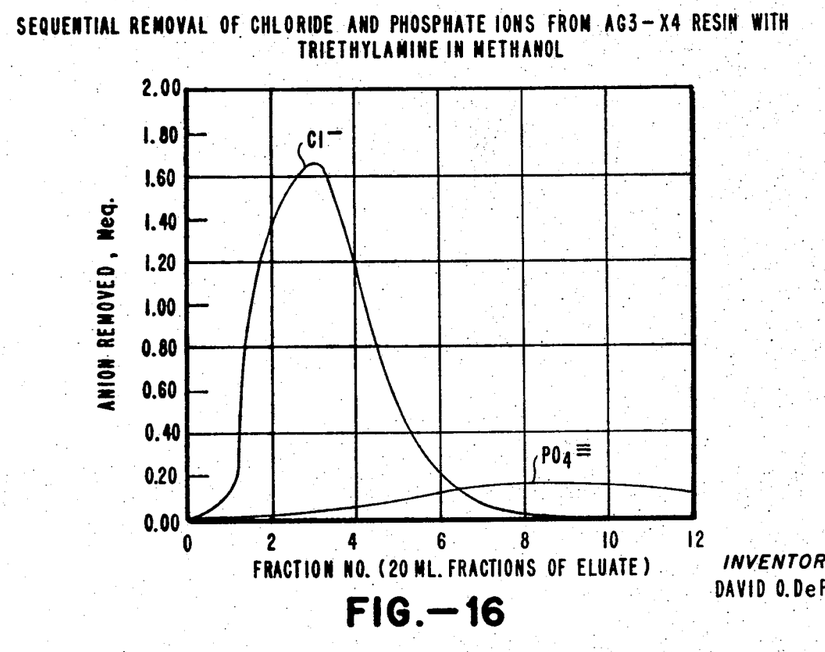
FIG. 16 shows that when both chloride and phosphate ions are present on the same resin triethylamine in methanol is both more effective in removing chloride but removes it sequentially from polyamine resins.

The following example shows the separation of chloride and phosphate ion in the regeneration of the anion exchange resin. A mixed resin (50% chloride loaded AG3–X4 anion exchange resin, 50% phosphate loaded AG3–X4 anion exchange resin) is treated with triethylamine in methanol. Phosphate removal is found to be both depressed and delayed as shown by the data presented in FIG. 16. Thus, if fractions one through six referred to in FIG. 16 were combined, a 95% chloride solution comprising about 98% of the total chloride removed would be recovered. Subsequent treatment of the resin with tribenzylamine in methanol/toluene has been found to depress the chloride removal and enhance the phosphate recovery to give a high purity phosphate solution.

The following examples illustrate the next steps in the process of this invention. The precipitation of metal carbonates from cationic regenerant streams regenerates the ligand solution for recycle and precipitates the cation from solution for subsequent reaction with the anionic regenerant stream.

EXAMPLE XII

The treatment of a 10,000 p.p.m. methanol solution of sodium acetylacetonate with carbon dioxide results in the precipitation of a mixture of sodium carbonate and sodium bicarbonate. Similarly, potassium carbonate and bicarbonate has been precipitated from a solution of potassium 2-acetylcyclohexanone in methanol.

The recovery of the anionic regenerant stream for recycle and precipitation of the metal salts is preferably accomplished through reaction with the metal carbonates recovered from the $CO_2$ treatment of the cationic regenerant stream at elevated temperatures. The chemical reaction is described by the following overall equation.

(X=anion, M=metal.)

The overall reaction can be described as occurring in two steps $$2R_3N.HX + M_2CO_3 \rightleftarrows R_3N.H_2CO_3 + 2MX\downarrow$$
$$\downarrow \Delta$$
$$R_3N + H_2O + CO_2\uparrow$$

Amino alcohols such as 2-aminoethanol are commonly used, however, other amines can be employed.

An alternate method for precipitating the metallic salts and recovering the carbon dioxide and amine regenerant for recycle is to conduct the process in a stepwise manner. Thus, the metal carbonate may first be thermally decomposed at 800 to 900° C. to the oxides and the $CO_2$ recovered for recycle. The metal oxides which are strong bases are then used to neutralize the solution of amine acid salts (the anionic regenerant stream) with the resultant precipitation of the metal salts and recovery of the free amine in solution for recycle.

The recovered anhydrous salts can be disposed of in open surface mine areas, etc. Known compositions of this type are Glauberite ($CaSO_4.Na_2SO_4$) or the similar salt containing four atoms of sodium, $CaSO_4.2Na_2SO_4$. The introduction of small quantities of other cations should have little effect on the launching properties. It is desirable for this application that the salts be produced as large agglomerates. This can be achieved by exposing the recovered salts in the desired compositions to high humidity to stimulate crystal growth and fusion.

The following example illustrates the application of the overall process to the removal of sodium and magnesium sulfates from a synthetic gypsum water containing 384 p.p.m. calcium ion, 25 p.p.m. magnesium ion and 1260 p.p.m. sulfate ion.

EXAMPLE XIII

A total of 4 g. of AG3–X4 resin (polyamine type resin, chloride form, Bio Rad. Laboratories), dry weight, was suspended in 500 ml. of 0.5 N NaOH and agitated for three hours to convert the resin to the OH⁻ form. The resin was separated by filtration using a sintered glass filter washed with 2000 ml. methanol and allowed to dry. The dried AG–3X resin (OH⁻ form) was thoroughly mixed with 2.5 g. of CG–50 cation exchange resin (polymethacrylic acid type H⁺ form, Mallinckrodt). The mixed resin was slurried in a ~40 ml. of the synthetic gypsum water and charged to a 12″ x ⅜″ glass chromatographic column. The column was placed in an assembly containing an automatic fraction collector using a 10 ml. automatic syphon pipette to collect 10 ml. fractions of eluate. An additional 160 ml. of the synthetic gypsum water was passed through the column. This constituted a total of 200 ml. including the initial 40 ml. used in charging the resin to the column. Ten ml. fractions of eluate were collected and fractions 1, 5, 10, 15 and 20 analyzed by emission spectroscopy for calcium, magnesium and sulfur. The results obtained were as follows:

| Eluate fraction No: | Conc. ions found, p.p.m. | | |
|---|---|---|---|
|  | Calcium | Magnesium | Sulfur |
| 1 | 19 | 3.5 | 80 |
| 5 | <5 | <2 | 70 |
| 10 | <5 | <2 | 50 |
| 15 | <5 | <2 | 75 |
| 20 | 6 | <2 | 60 |

The analysis for sulfur concentrations by this method were not very precise below 100 p.p.m.; however, these values indicate a very low sulfate concentration. These data show that the mixed bed resin has removed essentially all of the calcium and magnesium sulfates from the gypsum water. Because of the small quantities of material employed in the experiment, it was not possible to use some of the more standard engineering methods for separation of the resins. The resins instead were separated by their difference in density and particle size using a sedimentation technique. The finely divided, less dense anionic exchange resin is yellow in color and could easily be identified when contrasted with the coarser, more dense white cationic exchange resin. The resins were removed from the column, slurried in water and allowed to separate by sedimentation in a ½″ x 3′ column having a removable section 6″ long at the base fitted with a removable fritted disc. The resins settled with the yellow anionic resin on top and the more dense white cationic resin on the bottom. The water was drawn off through the fritted disc, the disc removed and the plug of resin pressed out of the bottom section of the column with a plunger. The resin plug was sliced into three portions, white cationic exchange resin, yellow anionic exchange resin and approximately one gram of the interface where some mixing had occurred. The white spent cationic exchange resin was slurried in water, charged to a ¼″ x 9″ chromatographic column and eluted with 50 ml. of a 2 N solution of 1,3-cyclohexanedione in methanol. This solution was prepared by dissolving 11.2 g. of 1,3-cyclohexanedione in methanol and diluting to 50 ml. Three ml. fractions of eluate were collected. Analysis of the eluate fractions by emission spectroscopy gave the following results, indicating efficient regeneration of the cationic resin by exchange of the ligand hydrogen for the cation on the resin.

| Fraction No. | Metal ion conc. in chelate regenerant sol., p.p.m. | |
|---|---|---|
|  | Calcium | Magnesium |
| 1 | <10 | <2 |
| 2 | <10 | <2 |
| 3 | 228 | 74 |
| 4 | 492 | 146 |
| 5 | 492 | 146 |
| 6 | 420 | 112 |
| 9 | 480 | 52 |
| 12 | 523 | 55 |
| 15 | 810 | 70 |

The column was washed with additional methanol (~20 ml.) and additional eluate fractions taken. Fraction 23 was found to contain less than 10 p.p.m. calcium and 2 p.p.m. magnesium. The yellow spent anionic exchange resin was slurried in water, charged to a ¼″ x 9″ chromatographic column and eluted with 100 ml. of a 2 N solution of 2-aminoethanol in methanol. This solution was prepared by dissolving 12.2 g. of 2-aminoethanol in methanol and diluting to 100 ml. with methanol. Three ml. fractions of eluate were collected. Analysis of the eluate fractions for sulfur by emission spectroscopy gave the following results indicating efficient regeneration of the anionic exchange resin.

| Fraction No.: | Sulfur conc., p.p.m. |
|---|---|
| 1 | <50 |
| 2 | <50 |
| 3 | 5,200 |
| 4 | [1] 18,000 |
| 5 | 5,900 |
| 6 | 3,500 |
| 7 | 1,700 |
| 10 | 320 |
| 15 | 100 |

[1] Equals 54,000 p.p.m. $SO_4^-$.

Because the solution from this experiment was fairly dilute in cation and had some excess chelating agent present, it was decided to precipitate the carbonates using ammonium carbonate to provide pH adjustment. Fractions 13, 14 and 15 (2 ml. each after removal of samples for analysis) were combined and treated with a saturated water solution of ammonium carbonate. Precipitation of a fine dense white solid occurred almost immediately. The white precipitate was separated by centrifugation, washed with water and then with methanol and dried. The metal carbonate precipitate was found to weigh 0.0261 g. The regenerated ligand solution containing excess ammonium carbonate was degassed under vacuum to remove CO₂ and excess ammonia and then passed through 3 grams (dry weight) of Dowex 50–X8 cationic resin (strongly acidic, polystyrene type). The pH of the solution changed from basic to acidic indicating the exchange of the chelate ammonium ion for the hydrogen ion of the resin. The chelate solution had thus been regenerated for recycle. The ammonium loaded cationic exchange resin was washed with methanol, dried and then heated to 100° C. at which temperature $NH_3$ was evolved as indicated by odor and a basic indication of the vapors with moist pH paper. This temperature is within the upper range of stability for polystyrene type resins as indicated by the resin manufacturers. The metal carbonate precipitate from above was suspended in eluate fraction 4 of the anionic regenerant stream (2 ml. remaining after analysis for sulfur). The mixture was heated and both a fine white precipitate and a flocculent precipitate formed. No gas was evolved. The supernated liquid was decanted and the precipitates washed with methanol and heated. The flocculent ppt. decomposed giving off $CO_2$ as indicated by passing the evolved gas through barium hydroxide solution to form a white precipitate. A small amount of liquid by-product was identified as the free amine by its odor. A residue of calcium sulfate remained. The sulfate ion was identified by the chloranilate test.

The following example illustrates an alternative approach for separating the metal salt pollutant and for the regeneration of the anionic regenerant stream.

EXAMPLE XIV

A mixture of 2 g. of calcium carbonate and 0.5 g. of magnesium carbonate precipitates is heated to 800 to 900° C. Heat is continued until all the carbonate is decomposed to the oxide as indicated by the cessation of carbon dioxide evolution. When the oxide residues, 1.43 g. total, are then allowed to react with an anion exchange regenerant solution comprised of 0.054 equivalent of 2-aminoethanol acid sulfate dissolved in 50 ml. of methanol, one obtains approximately 3.6 g. of a mixture of calcium and magnesium sulfates. This insoluble precipitate is filtered off from the 2-aminoethanol formed by the neutralization process.

Having fully described the invention it is intended that it be limited only by the lawful scope of the appended claims.

I claim:

1. The process for the treatment of an aqueous stream containing ionic pollutants to remove the ions from the stream and recover the ions which comprises: passing said aqueous stream through a bed of mixed ion exchange material to remove ionic pollutants from the stream and produce a substantially ion-free water, removing spent mixed ion exchange material from said bed and separating the same into anionic and cationic ion exchange material, removing the ionic pollutants from the separated spent anionic and cationic ion exchange material with anionic and cationic regenerant streams consisting essentially of charge bearing organic complexing agents in organic solvents to regenerate the anionic and cationic ion exchange material and to form spent anionic and cationic regenerant streams, returning the regenerated anionic and cationic exchange material to said bed, treating said spent cationic regenerant stream with a metal precipitant selected from the group consisting of carbon dioxide carbonates to form precipitated metal carbonates and recover the cationic regenerant stream for recycle to said spent cationic ion exchange material, and contacting said spent anionic regenerant stream with said precipitated metal carbonates at elevated temperatures to precipitate metal salts and recover metal precipitant for recycle to said spent cationic regenerant stream and anionic complexing agents for recycle to said spent anionic ion exchange material.

2. The method of claim 1 wherein the anionic regenerant stream comprises an organic base in an organic solvent.

3. The method of claim 1 wherein the anionic regenerant stream comprises an aliphatic amine in an organic solvent.

4. The method of claim 1 wherein the anionic regenerant stream comprises 2-aminoethanol in methanol.

5. The method of claim 1 wherein the anionic regenerant stream comprises an organic base, methanol and a hydrocarbon solvent.

6. The method of claim 1 wherein the anionic exchange material is regenerated by the sequential treatment with first one preferential organic amine and then another to selectively separate anions.

7. The process for the treatment of an aqueous stream containing ionic pollutants to remove the ions from the stream and recover the ions which comprises: passing said aqueous stream through a bed of mixed ion exchange material to remove ionic pollutants from the stream and produce a substantially ion-free water, removing spent mixed ion exchange material from said bed and separating the same into anionic and cationic ion exchange material, removing the ionic pollutants from the separated spent anionic and cationic ion exchange material with anionic and cationic regenerant streams consisting essentially of charge bearing organic complexing agents in organic solvents to regenerate the anionic and cationic ion exchange material and to form spent anionic and cationic regenerant streams, returning the regenerated anionic and cationic exchange material to said bed, treating said spent cationic regenerant stream with a metal precipitant selected from the group consisting of carbon dioxide carbonates to form precipitated metal carbonates and recover the cationic regenerant stream for recycle to said spent cationic ion exchange material, thermally decomposing said metal carbonate to form metal oxides and carbon dioxide, recycling said carbon dioxide to said spent cationic regenerant stream, and contacting said spent, anionic regenerant stream with said metal oxides at elevated temperatures to precipitate metal salts and recover anionic complexing agents for recycle to said spent anionic ion exchange material.

8. The process for the treatment of an aqueous stream containing ionic pollutants to remove the ions from the stream and recover the ions which comprises: passing said aqueous stream through a bed of mixed ion exchange material containing a polyacrylic cation exchange resin and a polyamine anion exchange resin to remove ionic pollutants from the stream and produce a substantially ion-free water, removing spent mixed ion exchange material from said bed and separating the same into anionic and cationic ion exchange material, removing the ionic pollutants from the separated spent anionic and cationic ion exchange material with anionic and cationic regenerant streams consisting essentially of charge bearing organic complexing agents in organic solvents to regenerate the anionic and cationic ion exchange material and to form spent anionic and cationic regenerant streams, returning the regenerated anionic and cationic exchange material to said bed, treating said spent cationic regenerant stream with a metal precipitant selected from the group consisting of carbon dioxide carbonates to form precipitated metal carbonates and recover the cationic regenerant stream for recycle to said spent cationic ion exchange material, and contacting said spent anionic regenerant stream with said precipitated metal carbonates at elevated temperatures to precipitate metal salts and recover metal precipitant for recycle to said spent cationic regenerant stream and anionic complexing agents for recycle to said spent anionic ion exchange material.

9. The process for the treatment of an aqueous stream containing alkali and alkaline earth metal ion pollutants to remove the ions from the stream and recover the ions which comprises: passing said aqueous stream through a bed of mixed ion exchange material containing a polyacrylic cation exchange resin and a polyamine anion exchange resin to remove ionic pollutants from the stream and produce a substantially ion-free water, removing spent mixed ion exchange material from said bed and separating the same into anionic and cationic ion exchange material, removing the ionic pollutants from the separated spent anionic and cationic ion exchange material with anionic and cationic regenerant streams consisting essentially of charge bearing organic complexing agents in organic solvents to regenerate the anionic and cationic ion exchange material and to form spent anionic and cationic regenerant streams, returning the regenerated anionic and cationic exchange material to said bed, treating said spent cationic regenerant stream with a metal precipitant selected from the group consisting of carbon dioxide carbonates to form precipitated metal carbonates and recover the cationic regenerant stream for recycle to said spent cationic ion exchange material, and contacting said spent anionic regenerant stream with said precipitated metal carbonates at elevated temperatures to precipitate metal salts and recover metal precipitant for recycle to said spent cationic regenerant stream and anionic complexing agents for recycle to said spent anionic ion exchange material.

10. The method of claim 1 wherein the anionic regenerant stream comprises a highly basic organic amine.

11. The method of claim 1 wherein the cationic regenerant stream comprises an organic chelating agent.

12. The method of claim 1 wherein the anionic and cationic regenerant streams include methanol as a solvent.

13. The process for the treatment of an aqueous stream containing ionic pollutants to remove the ions from the stream and recover the ions which comprises: passing said aqueous stream through a bed of mixed ion exchange material to remove ionic pollutants from the stream and produce a substantially ion-free water, removing spent mixed ion exchange material from said bed and separating the same into anionic and cationic ion exchange material, said anionic and cationic ion exchange material being substantially saturated with water, removing the ionic pollutants from the separated spent anionic and cationic ion exchange material with anionic and cationic regenerant streams consisting essentially of charge bearing organic complexing agents in organic solvents to regenerate the anionic and cationic ion exchange material and to form spent anionic and cationic regenerant streams, returning the regenerated anionic and cationic exchange material to said bed, treating said spent cationic regenerant stream with a metal precipitant selected from the group consisting of carbon dioxide carbonates to form precipitated metal carbonates and recover the cationic regenerant stream for recycle to said spent cationic ion exchange material and contacting said spent anionic regenerant stream with said precipitated metal carbonates at elevated temperatures to precipitate metal salts and recover metal precipitant for recycle to said spent cationic regenerant stream and anionic complexing agents for recycle to said spent anionic ion exchange material.

14. The process for the treatment of an aqueous stream containing ionic pollutants to remove the ions from the stream and recover the ions which comprises: counter-currently passing said aqueous stream through a bed of mixed ion exchange material to remove ionic pollutants from the stream and produce a substantially ion-free water, removing spent mixed ion exchange material from said bed and separating the same into anionic and cationic ion exchange material, removing the ionic pollutants from the separated spent anionic and cationic ion exchange material with anionic and cationic regenerant streams consisting essentially of charge bearing organic complexing agents in organic solvents to regenerate the anionic and cationic ion exchange material and to form spent anionic and cationic regenerant streams, returning the regenerated anionic and cationic exchange material to said bed, treating said spent cationic regenerant stream with carbon dioxide to form precipitated metal carbonates and recover the cationic regenerant stream for recycle to said spent cationic ion exchange material, and contacting said spent anionic regenerant stream with said precipitated metal carbonate at elevated temperatures to precipitate metal salts and recover carbon dioxide for recycle to said spent cationic regenerant stream and anionic complexing agents for recycle to said spent anionic ion exchange material.

15. The process for the treatment of an aqueous stream containing ionic pollutants to remove the ions from the stream and recover the ions which comprises: passing said aqueous stream through a bed of mixed ion exchange material to remove ionic pollutants from the stream and produce a substantially ion-free water, removing spent mixed ion exchange material from said bed and separating the same into anionic and cationic ion exchange material, said anionic and cationic ion exchange material being substantially saturated with water, removing the ionic pollutants from the separated spent anionic and cationic ion exchange material with anionic and cationic regenerant streams consisting essentially of charge bearing organic complexing agents in organic solvents to regenerate the anionic and cationic ion exchange material and to form spent anionic and cationic regenerant streams, returning the regenerated anionic and cationic exchange material to said bed, treating said spent cationic regenerant stream with a metal precipitant selected from the group consisting of carbon dioxide carbonates to form precipitated metal carbonates and recover the cationic regenerant stream for recycle to said spent cationic ion exchange material, and contacting said spent anionic regenerant stream with said precipitated metal carbonates at elevated temperatures to precipitate anhydrous metal salts and recover metal precipitant for recycle to said spent cationic regenerant stream and anionic complexing agents for recycle to said spent anionic ion exchange material.

References Cited

UNITED STATES PATENTS

| 3,385,787 | 5/1968 | Crits et al. | 210—32 |
| 3,438,891 | 4/1969 | Schmidt | 210—32 |

FOREIGN PATENTS

| 862,688 | 3/1961 | Great Britain. |

SAMIH N. ZAHARNA, Primary Examiner

U.S. Cl. X.R.

210—34